United States Patent
Spryshak

(10) Patent No.: US 12,330,473 B2
(45) Date of Patent: Jun. 17, 2025

(54) INTEGRATED STACKED HEAT EXCHANGERS

(71) Applicant: Air International (US) Inc., Auburn Hills, MI (US)

(72) Inventor: Joseph J. Spryshak, Hartland, MI (US)

(73) Assignee: Air International (US) Inc., Auburn Hills, MI (US)

( * ) Notice: Subject to any disclaimer, the term of this patent is extended or adjusted under 35 U.S.C. 154(b) by 355 days.

(21) Appl. No.: 17/900,368

(22) Filed: Aug. 31, 2022

(65) Prior Publication Data

US 2024/0066943 A1    Feb. 29, 2024

(51) Int. Cl.
*B60H 1/00* (2006.01)
*F28D 9/00* (2006.01)
*F28D 21/00* (2006.01)

(52) U.S. Cl.
CPC ..... *B60H 1/00342* (2013.01); *B60H 1/00271* (2013.01); *F28D 9/0093* (2013.01); *F28D 21/00* (2013.01); *B60H 2001/00307* (2013.01); *F28D 2021/008* (2013.01)

(58) Field of Classification Search
CPC ............... B60H 1/00278; F28D 9/0093
See application file for complete search history.

(56) References Cited

U.S. PATENT DOCUMENTS

2022/0194167 A1    6/2022  Morimoto et al.
2024/0239159 A1*   7/2024  Grotendorst ......... B60H 1/3229

FOREIGN PATENT DOCUMENTS

| CN | 108023143 A | 5/2018 | |
| CN | 114787572 A | 7/2022 | |
| DE | 102013021360 A1 * | 6/2015 | ......... B60H 1/00278 |
| WO | 2023220467 A1 | 11/2023 | |

OTHER PUBLICATIONS

International Search Report for International Application No. PCT/US2023/031547 dated Dec. 12, 2023.

* cited by examiner

*Primary Examiner* — Eric S Ruppert

(74) *Attorney, Agent, or Firm* — Carlson, Gaskey & Olds, P.C.

(57) ABSTRACT

A vehicle refrigeration system according includes a first chiller including a refrigerant fluid path and a coolant fluid path. A second chiller includes a refrigerant fluid path, a coolant fluid path, a first chiller coolant inlet, a second chiller coolant inlet, a first chiller coolant outlet, and a second chiller coolant outlet. A refrigerant control block includes outer walls providing openings in fluid communication with control block refrigerant fluid paths. The openings include a first chiller control block outlet and a second chiller control block outlet. The first chiller receives refrigerant flowing out of the first chiller control block outlet and into the first chiller refrigerant fluid path. The second chiller receives refrigerant flowing out of the second chiller control block outlet, through the first chiller, and into the second chiller refrigerant fluid path.

16 Claims, 15 Drawing Sheets

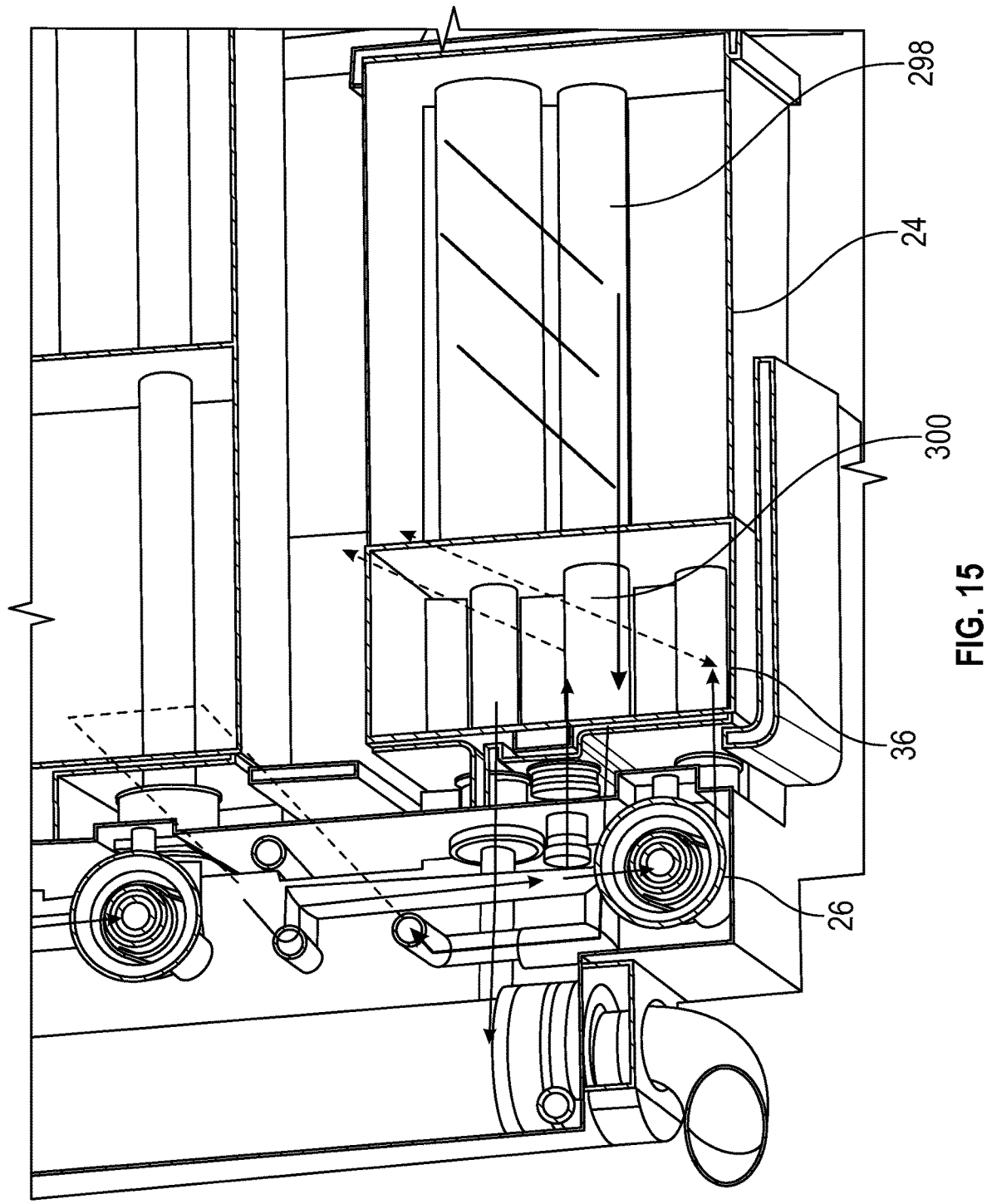

INTEGRATED STACKED HEAT EXCHANGERS

BACKGROUND

Vehicles may have a HVAC (Heating, ventilation, and air conditioning) climate control system located within an instrument panel which provides conditioned air, such as by heating or cooling or dehumidifying, through various outlets to occupants in the vehicle cabin.

Additionally, the vehicle may have other components and systems that receive controlled heat transfer. For example, the batteries may be heated or cooled to stay within optimal performance and to increase longevity. The heat sink or heat source for such HVAC systems and other heating or cooling may be generated by a refrigeration system.

SUMMARY

A vehicle refrigeration system according to an example of this disclosure includes a first chiller including a refrigerant fluid path and a coolant fluid path. A second chiller includes a refrigerant fluid path, a coolant fluid path, a first chiller coolant inlet, a second chiller coolant inlet, a first chiller coolant outlet, and a second chiller coolant outlet. A refrigerant control block includes outer walls providing openings in fluid communication with control block refrigerant fluid paths. The openings include a first chiller control block outlet and a second chiller control block outlet. The first chiller receives refrigerant flowing out of the first chiller control block outlet and into the first chiller refrigerant fluid path. The second chiller receives refrigerant flowing out of the second chiller control block outlet, through the first chiller, and into the second chiller refrigerant fluid path. The second chiller receives coolant flowing into the second chiller coolant inlet, through the second chiller coolant fluid path, and out of the second chiller coolant outlet. The first chiller receives coolant flowing into the first chiller coolant inlet, through the second chiller, through the first chiller coolant fluid path, and out of the first chiller coolant outlet.

In a further example of the foregoing, the first and second chillers are positioned in a stacked arrangement.

In a further example of any of the foregoing, the first and second chillers include a plurality of plates substantially parallel to one another.

In a further example of any of the foregoing, the plurality of plates form a first plurality of cavities and a second plurality of cavities arranged between respective ones of the first plurality of cavities in alternating fashion.

In a further example of any of the foregoing, the first plurality of cavities receive the refrigerant.

In a further example of any of the foregoing, the second plurality of cavities receive the coolant.

In a further example of any of the foregoing, the first chiller refrigerant path includes a first chiller refrigerant inlet channel and a first chiller refrigerant outlet channel in fluid communication with the first plurality of cavities in the first chiller and sealed from fluid communication with the second plurality of cavities within the first chiller.

In a further example of any of the foregoing, the second chiller refrigerant path includes a second chiller refrigerant inlet channel and a second chiller refrigerant outlet channel in fluid communication with the first plurality of cavities in the second chiller and sealed from fluid communication with the second plurality of cavities within the second chiller.

In a further example of any of the foregoing, the first chiller includes a refrigerant inlet transfer channel fluidly between the second chiller control block outlet and the second chiller refrigerant inlet channel, and a refrigerant outlet transfer channel fluidly between the second chiller refrigerant outlet channel and the refrigerant control block, and the inlet transfer channel is sealed from fluid communication with the first plurality of cavities and the second plurality of cavities within the first chiller.

In a further example of any of the foregoing, the outlet transfer channel is sealed from fluid communication with the first plurality of cavities and the second plurality of cavities within the first chiller.

In a further example of any of the foregoing, the outlet transfer channel and the first refrigerant outlet channel are the same.

In a further example of any of the foregoing, the first chiller provides coolant to a first component of a vehicle, and the second chiller provides coolant to a second, different component of the vehicle In a further example of any of the foregoing, the second chiller coolant fluid path includes a second chiller coolant inlet channel and a second chiller coolant outlet channel in fluid communication with the second plurality of cavities within the second chiller and sealed from fluid communication with the first plurality of cavities within the second chiller.

In a further example of any of the foregoing, the first chiller coolant fluid path includes a first chiller coolant inlet channel and a first chiller coolant outlet channel in fluid communication with the second plurality of cavities within the first chiller and sealed from fluid communication with the first plurality of cavities within the first chiller.

In a further example of any of the foregoing, the second chiller includes a coolant inlet transfer channel for transferring coolant to the first chiller coolant inlet channel and a coolant outlet transfer channel for transferring coolant from the first chiller coolant outlet channel.

In a further example of any of the foregoing, the vehicle refrigeration system includes a condenser and a vapor injection module positioned in a stacked arrangement.

A vehicle refrigeration system according to an example of this disclosure includes a first heat exchanger including a plurality of plates, a refrigerant fluid path, a coolant fluid path, and a face. The face provides a first refrigerant inlet, a second refrigerant inlet, a first refrigerant outlet, and a second refrigerant outlet. A second heat exchanger includes a plurality of plates, a refrigerant fluid path, a coolant fluid path, and a face. The face provides a first coolant inlet, a second coolant inlet, a first coolant outlet, and a second coolant outlet. A refrigerant control block includes a plurality of openings interfacing with the first refrigerant inlet and the second refrigerant inlet.

In a further example of the foregoing, the first heat exchanger includes a refrigerant transfer channel through the plurality of plates for transferring refrigerant through the first heat exchanger to the second heat exchanger.

In a further example of any of the foregoing, the second heat exchanger includes a coolant transfer channel through the plurality of plates for transferring coolant through the second heat exchanger to the first heat exchanger.

In a further example of any of the foregoing, the first heat exchanger includes a second refrigerant transfer channel through the plurality of plates for transferring refrigerant from the second heat exchanger, through the first heat exchanger, to the second refrigerant outlet, and the second heat exchanger includes a second coolant transfer channel through the plurality of plates for transferring coolant from the first heat exchanger, through the second heat exchanger, and to the first coolant outlet.

These and other features may be best understood from the following specification and drawings, the following of which is a brief description.

BRIEF DESCRIPTION OF THE DRAWINGS

FIG. 15 schematically illustrates the flow paths through a sectional view of an example condenser and vapor injection module.

DETAILED DESCRIPTION

This disclosure is related to HVAC and refrigeration systems, and more particularly to heat exchangers positioned in a stacked arrangement.

Figure 1:
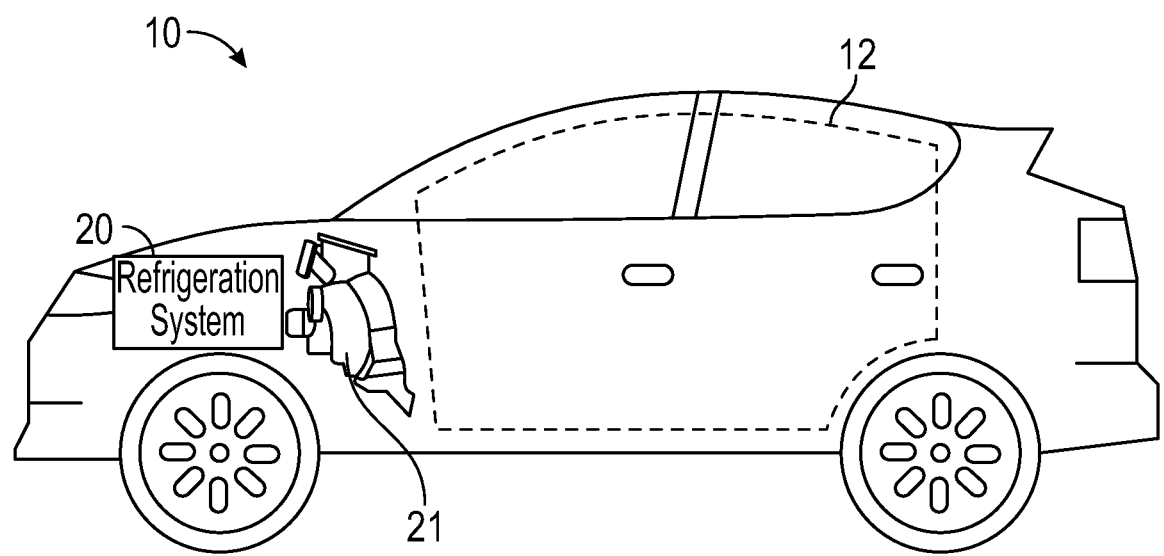
FIG. 1 schematically illustrates an example HVAC system and refrigeration system in a vehicle.

FIG. 1 schematically illustrates a vehicle 10 including an example refrigeration system 20. In some examples, the example refrigeration system 20 may provide heat sink and source of heat in order to allow an HVAC system 21 to provide conditioned air to a vehicle cabin 12. In some examples, the example refrigeration system 20 may cool or heat components or systems on board the vehicle. In some examples, glycol or other heat transfer fluid will get heated or cooled in the refrigeration system 20 and then flow to the HVAC system 21 or other components such as batteries, traction motors, electronics, etc. to exchange heat. In some examples, the vehicle 10 may include any of automobiles, heavy trucks, agricultural vehicles, or commercial vehicles.

Figure 2:
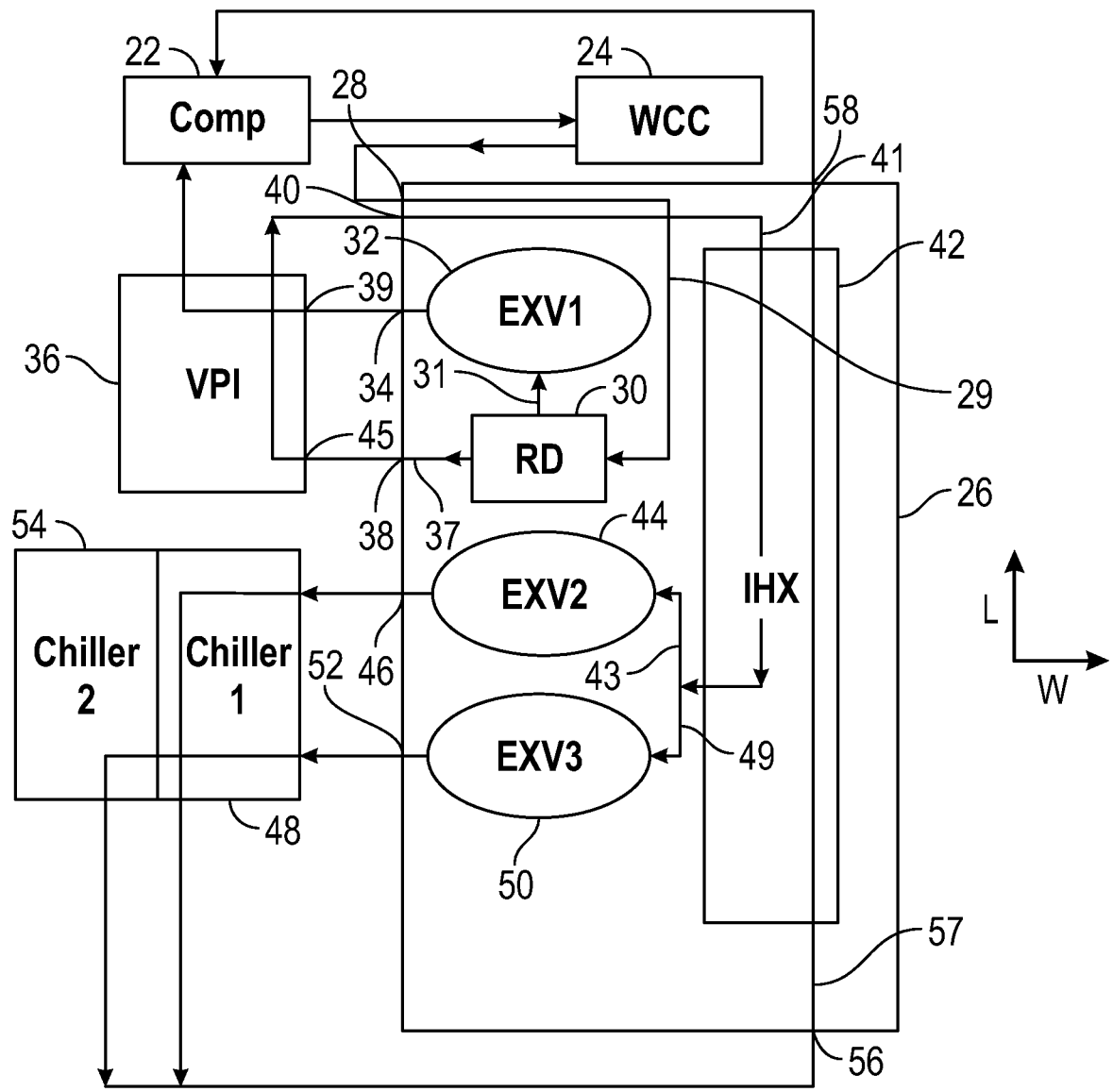
FIG. 2 schematically illustrates the example refrigeration system of FIG. 1.

FIG. 2 schematically illustrates the example refrigeration system 20 of FIG. 1. Refrigerant enters a compressor 22 as low-pressure, low-temperature gas, and leaves the compressor 22 as a high-pressure, high-temperature gas and flows to a condenser 24, which removes heat from the hot refrigerant vapor until it condenses into a saturated liquid state. In some examples, the condenser 24 is a water-cooled condenser, in which it removes heat from refrigerant vapor and transfers the heat to the water running through it. The compressor 22 may be a vapor injection compressor in some examples. In the example, the refrigerant flows from the condenser 24 into a refrigerant control block 26 at control block inlet 28 ("the condenser control block inlet 28") and flows through an internal path 29 within the refrigerant control block 26 to a receiver drier 30 to clean and remove moisture from the system.

The example control block 26 is a solid block with openings in its outer walls providing block inlets and outlets 28, 34, 38, 40, 46, 52 internal to the control block 26 in fluid communication with internal fluid paths 29, 31, 37, 41, 43, 49, 57, as shown schematically. In some examples, the control block 26 is formed of metal. In some examples, the control block 26 includes aluminum. In some examples, the control block 26 is formed of resin. In some examples, the control block 26 is formed by one or more of extrusion, casting, and forging. In some examples, the control block 26 is monolithic. In some examples, the internal fluid paths and openings may be formed by voids in the material of the control block 26. The word "internal" as used herein generally means within the outer walls of the control block 26.

From the receiver drier 30, a first refrigerant path 31 flows from the receiver drier 30 internally to the refrigerant control block 26 across a first expansion valve (EXV) 32, out of the refrigerant control block 26 through a control block outlet 34 ("the VPI outlet"). Generally, herein, the control block 26 inlets and outlets will be named with the first word being the upstream component for block inlets and the downstream component for block outlets. For example, the control block outlet 34 will be named VPI control block outlet 34, and the control block inlet 28 will be named condenser control block inlet 28. The first expansion valve 32 modulates flow out of the VPI control block outlet 34. From there, the refrigerant flows through a vapor injection module 36, in some examples through a saturated mid pressure inlet 39 of the vapor injection module 36, and within the vapor injection module 36 the refrigerant exchanges heat with another refrigerant path (discussed below) before flowing back to the compressor 22. The vapor injection module 36 reduces or eliminates the amount of liquid refrigerant flowing to the compressor 22. A second refrigerant path 37 from the receiver drier 30 flows internally to the refrigerant control block 26 and then out of the refrigerant control block 26 at a second VPI control block outlet 38, into the vapor injection module 36 at a VPI liquid inlet 41, through the vapor injection module 36, back into the refrigerant control block 26 at a VPI control block inlet 40, through an internal flow path 41, including through an internal heat exchanger 42 provided by a lengthwise flow path within the refrigerant control block 26. In some examples, the VPI control block inlet 40 is block inlet from a high-pressure liquid outlet of the vapor injection module 36. In some examples the locations for inlets outlets 28/40 are reversed.

In some examples, as shown, refrigerant exits the internal heat exchanger 42 and splits, within the refrigerant control block 26, into a first internal flow path 43 and a second internal flow path 49. The first internal flow path 43 flows across a second expansion valve 44, and then exits the refrigerant control block 26 through first chiller control block outlet 46 flowing through a first chiller 48. The second expansion valve 44 modulates flow through the first chiller control block outlet 46. The second internal flow path 49 of the split flows across a third expansion valve 50, and then exits the refrigerant control block 26 through outlet 52 flowing through a first chiller 54. In some examples, as shown schematically the refrigerant exiting the chillers 48, 54 may join paths before flowing back into the refrigerant control block 26 at a chiller control block inlet 56, through an internal flow path 57, including through the internal heat exchanger 42, and then exiting the refrigerant control block 26 at compressor control block outlet 58, and flowing to the compressor 22. In some examples, as shown, the flow path 41 through the internal heat exchanger 42 and the flow path 57 through the internal heat exchanger 42 have generally opposite lengthwise directions. In some examples, the refrigerant exiting the second chiller 54 may pass back through the chiller 48 before flowing back into the refrigerant control block 26 at the chiller control block inlet 56.

Although two chillers 48, 54 are shown in the illustrative example, more or fewer chillers may be utilized in some examples. In some examples, the chillers 48, 54 reduce the temperature of coolant flowing through the chillers 48, 54 by exchanging heat with the refrigerant flowing through. The coolant can then be used to cool various areas or components of the vehicle, including the cabin, another heat exchanger, the battery, vehicle electronics, drive motors in some examples. Although on configuration is shown in FIG. 2, other refrigerant system configurations may benefit from this disclosure. In some examples, the first chiller 48 and the second chiller 54 send coolant to separate components and/or areas of the vehicle. In some examples, having first and second chillers 48, 54 allows for independently controllable coolant exit temperatures from the chillers 48, 54. In some examples, having two chillers allows for cooler achievable temperatures in one chiller in a scenario in which flow is shut down through the other chiller. In some examples, the two chillers 48, 54 could be brazed together as one unit.

Figure 3:
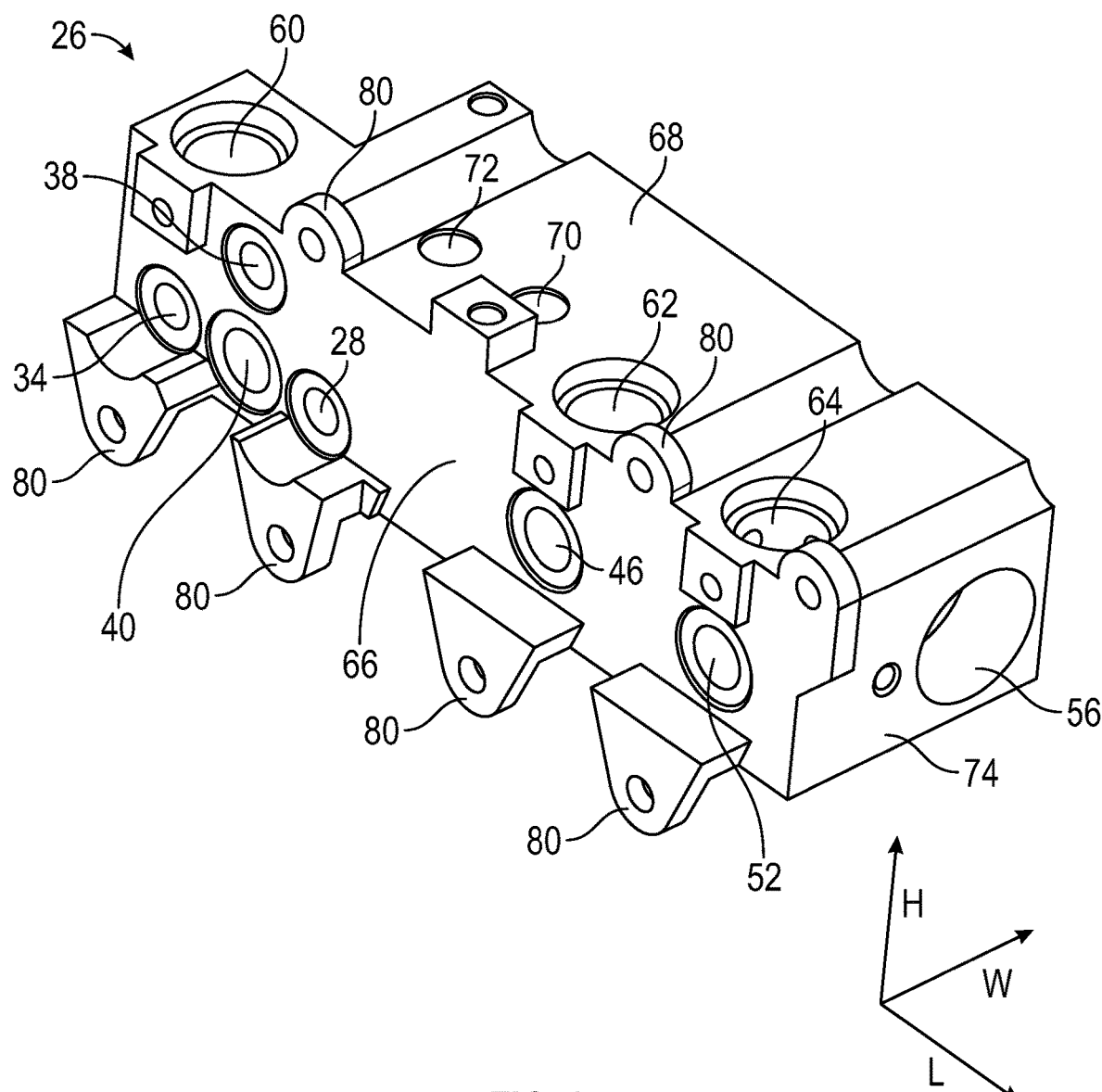
FIG. 3 is an isometric view of an example control block of the example refrigeration system of FIGS. 1-2.

FIG. 3 illustrates an example control block 26. In some examples, refrigerant systems with other control block configurations, or refrigerant systems without control blocks, would benefit from this disclosure. A first EXV opening 60 receives the first EXV 32 (not shown; see FIG. 2) for modulating refrigerant flow out of the first VPI outlet 34 on the control block 26 through the vapor injection module (not shown; see FIG. 2) to the compressor (not shown; see FIG. 2). A second EXV opening 62 receives a second EXV 44 (not shown; see FIG. 2) for modulating refrigerant flow out of a first chiller control block outlet 46 on the control block 26 to the first chiller 48 (not shown; see FIG. 2). The control block 26 may include a third EXV opening 64 receiving a third EXV 50 (not shown; see FIG. 2) for modulating refrigerant flow out of a second chiller control block outlet 52 on the control block 26 to the second chiller 54 (not shown; see FIG. 2).

In some examples, as shown, a first wall 66 of the refrigerant control block 26 provides the control block inlets and outlets 28, 34, 38, 40, 46, 52. In some examples, the first wall 66 extends substantially lengthwise and heightwise. In some examples, the wall 66 is formed of one or more coplanar faces, or one or more faces lying in different planes that are substantially parallel to each other (±20 degrees). In some examples, center axes perpendicular to each control block inlet and outlet 28, 34, 38, 40, 46, 52 at its respective wall surface are substantially parallel to each other (±20 degrees).

In some examples, as shown, the refrigerant control block 26 includes a second wall 68 providing the first EXV opening 60, the second EXV opening 62, and the third EXV opening 64. In some examples, the second wall 68 extends substantially lengthwise and widthwise. In some examples, the wall 68 is formed of one or more coplanar faces, or one or more faces lying in different planes that are substantially parallel to each other (±20 degrees). The walls 66, 68 may be adjoining walls in some examples, as shown. In some examples, the receiver drier 30 (not shown; see FIG. 2) is mounted to the second wall 68. In such examples, as shown, the second wall 68 provides an outlet 70 from the refrigerant control block 26 to the receiver drier 30 and an inlet 72 from the receiver drier 30 to the control block. In other examples, the receiver drier 30 may be mounted to a wall opposite the second wall 68 in the heightwise direction. The example chiller control block inlet 56 is provided at a third wall 74. The third wall 74 may adjoin the first and second walls 66, 68, as shown. In some examples, center axes perpendicular to each opening 60, 62, 64, 70, 72 at its respective wall surface are substantially parallel to each other (±20 degrees).

Figure 4:
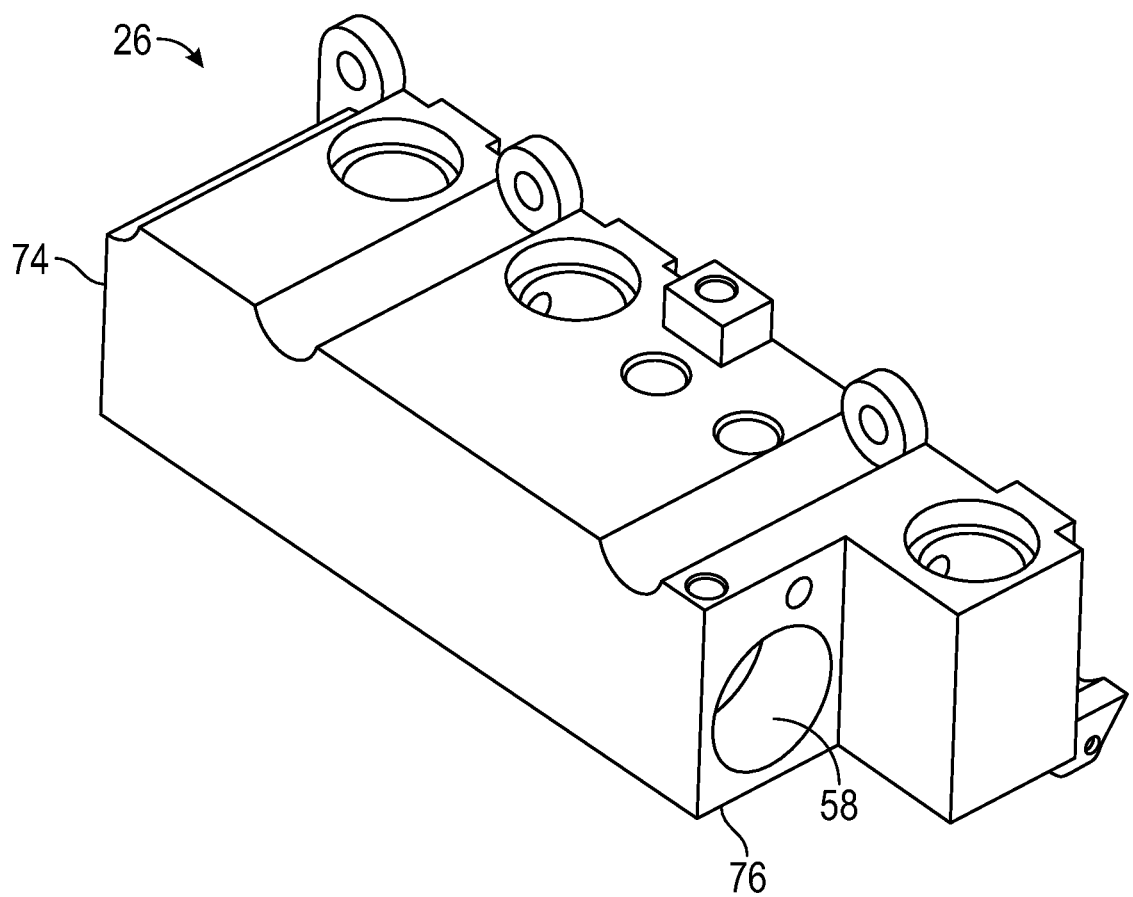
FIG. 4 is another isometric view of the example control block of FIG. 3.

FIG. 4 illustrates a different view of the example control block 26 showing the compressor control block outlet 58 at a fourth wall 76 opposite the third wall 74 in the lengthwise direction.

Figure 5:
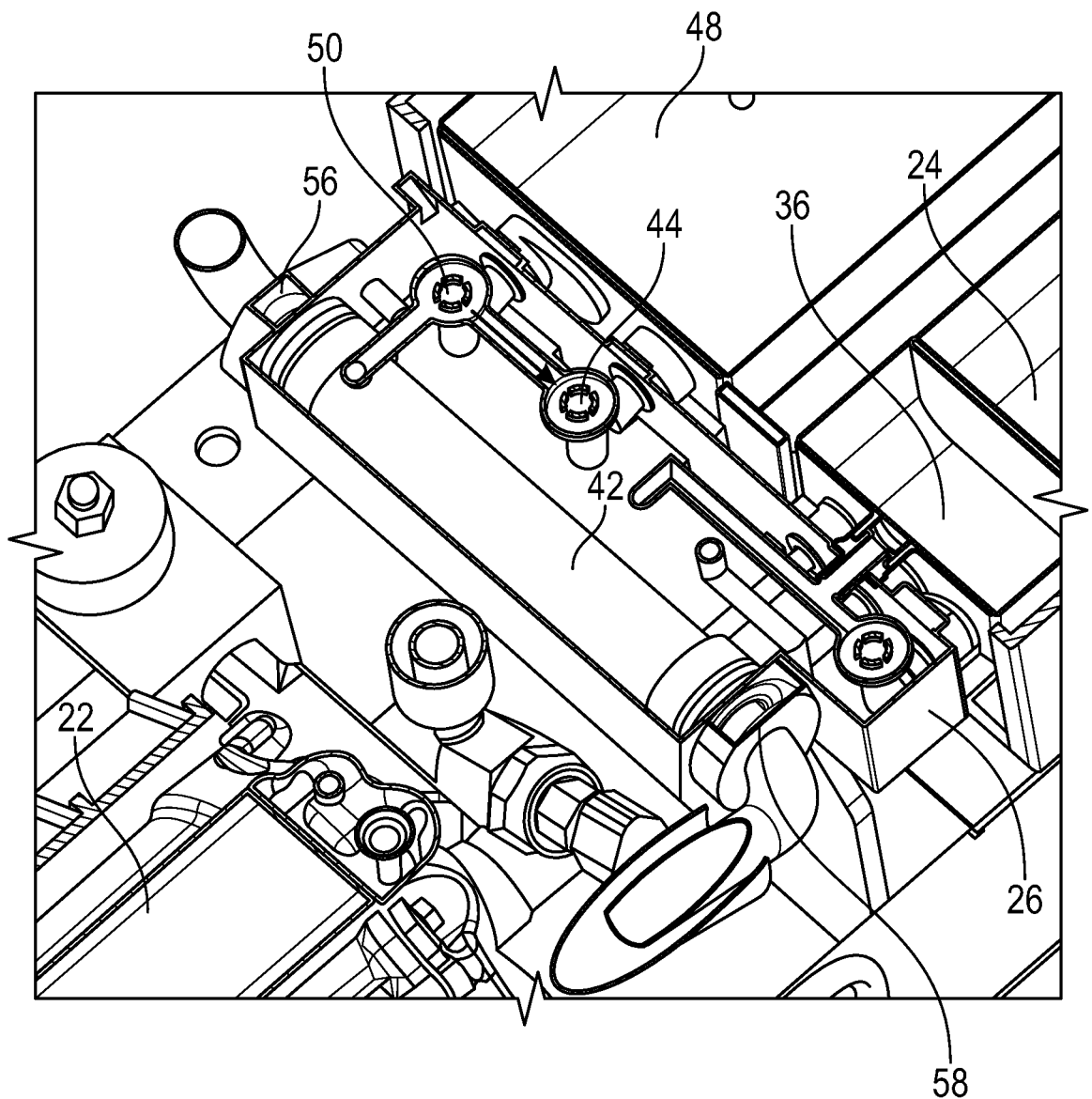
FIG. 5 is an interior view of the example control block of FIGS. 3-4.

FIG. 5 illustrates a sectional view of part of the example refrigeration system 20 of FIGS. 1-4. The control block 26 provides an internal heat exchanger 42 including a cylindrical passage providing one or more refrigerant paths. The example control block 26 is mounted to the first chiller 48 and the vapor injection module 36. In some examples, example control block 26 is mounted to the first chiller 48 and the vapor injection module 36 by bolting the control block 26 to respective housings of the first chiller 48 and the vapor injection module 36. The example control block 26 may include one or more brackets 80 (see FIG. 3) for the mounting. The example control block 26 eliminates plumbing to heat exchangers, reduces cost and assembly time, and reduces leak paths. One wall of the control block 26 interfaces with liquid refrigerant connections to multiple heat exchangers. It is noted that FIG. 5 is a sectional view with the top of the control block 26 removed. The example control block 26 is solid and may be drilled and plugged to obtain the internal passages needed. In some examples the IHX through hole 42 may be created using an extrusion process with a profile that includes the hole.

Figure 6:
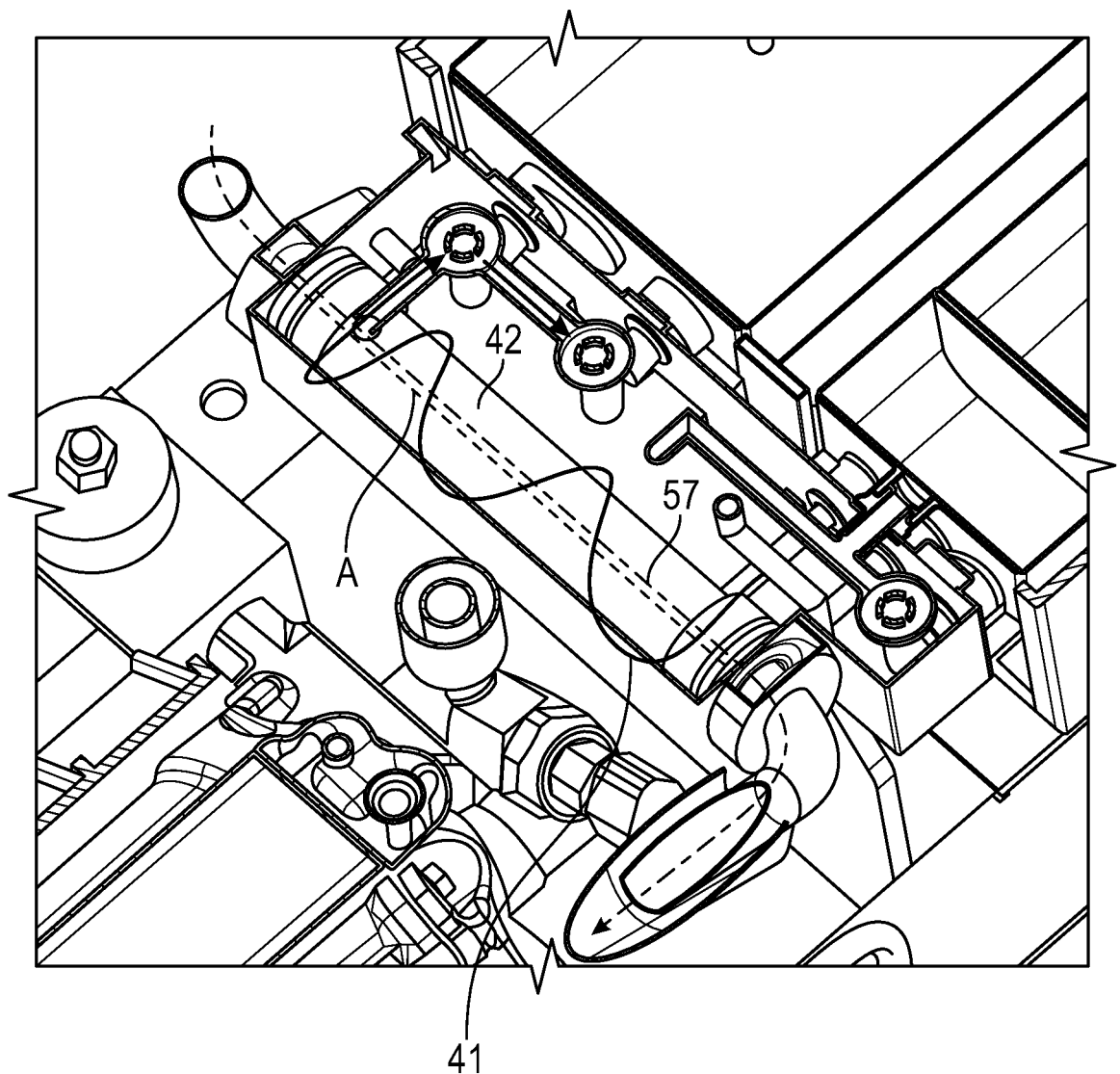
FIG. 6 is another interior view of the example control block of FIGS. 3-5.

FIG. 6 schematically illustrates refrigerant flow through the internal heat exchanger 42. In some examples, as shown, the path 57 through the internal heat exchanger 42 is substantially in an axial direction with regard to the axis A of the internal heat exchanger 42, and the path 41 through internal heat exchanger 42 is a spiraling path. In some examples, the path 57 may flow through an inner diameter section of the internal heat exchanger 42, and the path 41 may flow through an outer diameter section. In some examples, the refrigerant in path 57 is a low pressure vapor, and the refrigerant in path 41 is a high pressure liquid.

Figure 7:
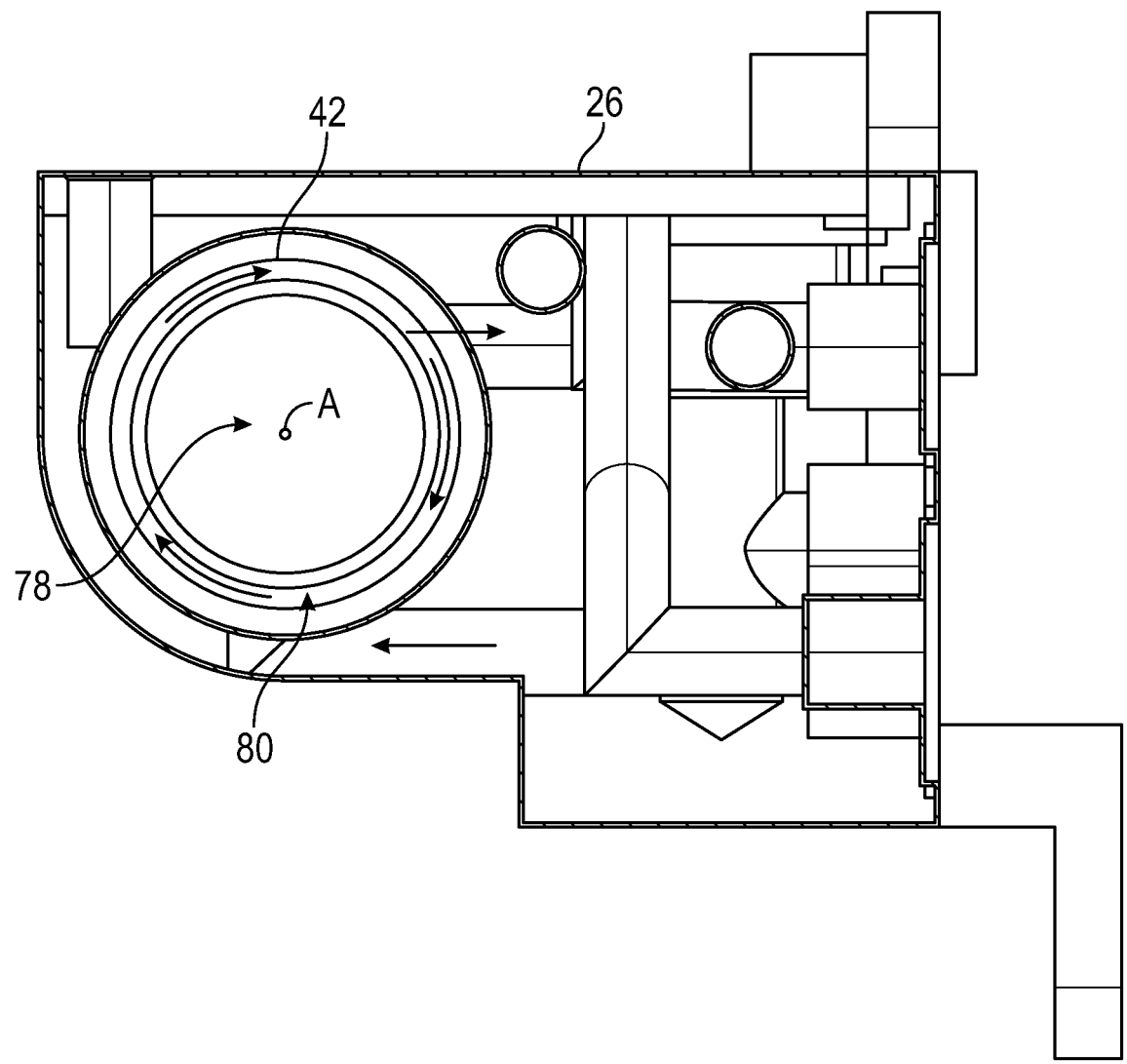
FIG. 7 illustrates a sectional view of the example control block of FIGS. 3-6.

FIG. 7 illustrates a sectional view of the example control block 26 through the internal heat exchanger 42. In the example, with continued reference to FIG. 6, the path 57 flows through an inner diameter section 78 of the internal heat exchanger 42, and the path 41 flows through a fluidly separate outer diameter section 80 of the internal heat exchanger 42. The function of heat exchange between liquid refrigerant upstream of expansion and suction line refrigerant downstream of chillers 48, 54 is integrated completely into integrated refrigerant control block 26. In some examples, the through hole for the internal heat exchanger 42 may be part of the refrigerant control block 26 extrusion profile.

Figure 8B:
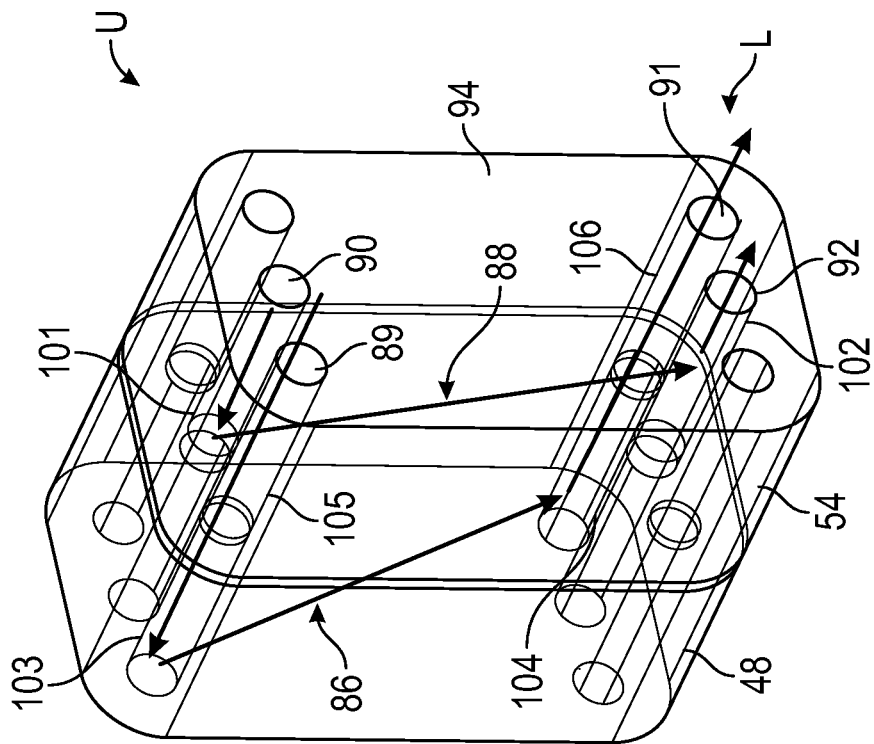
FIG. 8B schematically illustrates another view of the example chillers of FIG. 8A.
Figure 8A:
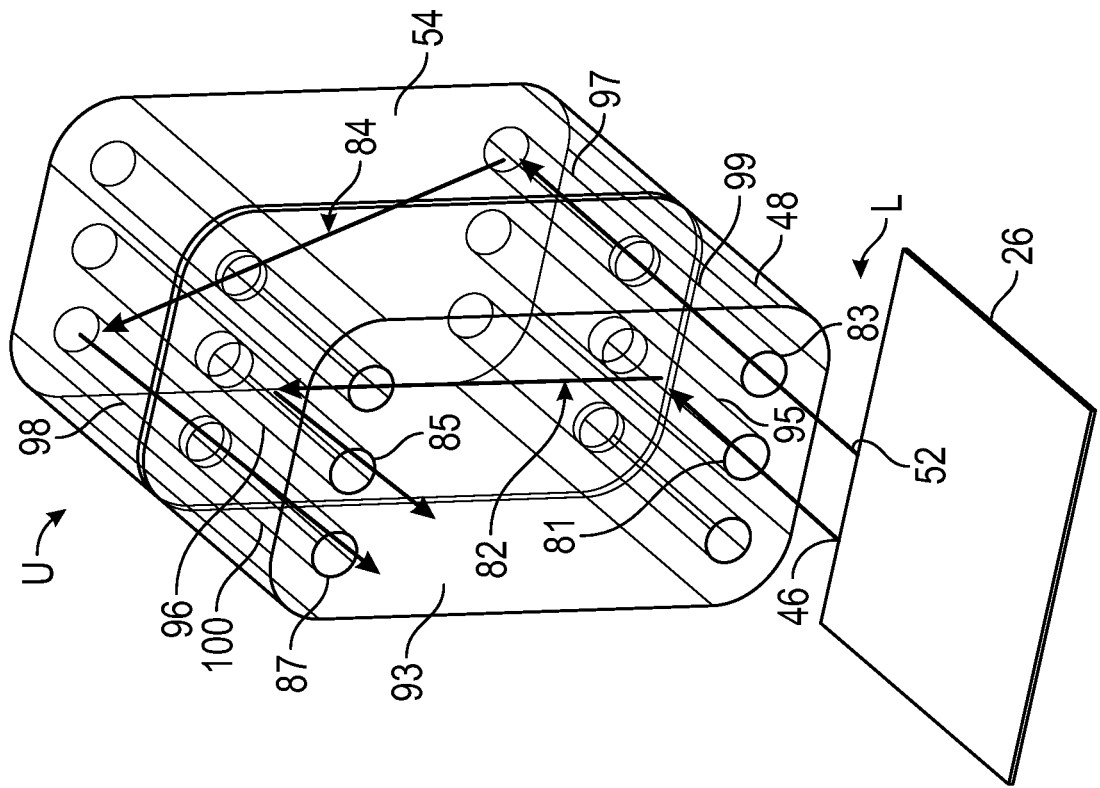
FIG. 8A schematically illustrates example chillers of the example refrigeration system.

FIG. 8A schematically illustrates refrigerant flow through the example first chiller 48 and the example second chiller 54. FIG. 8B schematically illustrates coolant flow through the first chiller 48 and the second chiller 54. The first chiller 48 includes a refrigerant fluid path 82, and the second chiller 54 includes a refrigerant fluid path 84. The first chiller 48 includes a coolant fluid path 86, and the second chiller 54 includes a coolant fluid path 88. The first chiller 48 includes a first chiller refrigerant inlet 81, a second chiller refrigerant inlet 83, a first chiller refrigerant outlet 85, and a second chiller refrigerant outlet 87. The second chiller 54 includes a first chiller coolant inlet 89, a second chiller coolant inlet 90, a first chiller coolant outlet 91, and a second chiller coolant outlet 92. In some examples, the exit temperatures at the outlets 85, 87 may be measured independently by one or more thermocouple sensors (not shown). Other outlets discussed herein may have similar capability.

Referring to FIG. 8A, the example first chiller 48 receives refrigerant flowing out of the first chiller control block outlet 46 (shown schematically) and into the first chiller refrigerant inlet 81, through the first chiller refrigerant fluid path 82, and out of the first chiller refrigerant outlet 85. The second chiller 54 receives refrigerant flowing out of the second chiller control block outlet 52 (shown schematically), into the second chiller refrigerant inlet 83, through the first chiller 48, through the second chiller refrigerant fluid path 84, back through the first chiller 48, and out of the second chiller refrigerant outlet 87.

Referring to FIG. 8B, the second chiller 54 is configured to receive coolant flowing into the second chiller coolant inlet 90, through the second chiller coolant fluid path 88, and out of the second chiller coolant outlet 92. The first chiller 48 is configured to received coolant flowing into the first chiller coolant inlet 89, through the second chiller 54, through the first chiller coolant fluid path 86, back through the second chiller 54, and out of the first chiller coolant outlet 91.

As discussed further below, the respective refrigerant paths 82, 84 and coolant paths 86, 88 are provided by channels and cavities provided by spaced apart plates, and are kept fluidly separate from one another such that the refrigerant does not mix with the coolant, but still exchanges heat with the coolant. In some examples, coolant exits the chillers 48, 54 at a lower temperature than when it entered the chillers 48, 54. In some examples, as shown, coolant flows in near the lower end L of the chillers 48, 54 and out near the upper end U, such that air bubbles are flushed out with the flow. In some examples, this can be reversed, such as when special coolant fill procedures are used.

In some examples, as shown in FIGS. 8A and 8B, the chillers 48, 54 are positioned in a stacked arrangement. In some examples, one of the first chiller 48 and second chiller 54 is mounted to the other of the first chiller 48 and the second chiller 54. In some examples, as shown, the inlets and outlets 81, 83, 85, and 87 are all provided at a face 93 of the first chiller 48. In some examples, as shown, the inlets and outlets 89, 90, 91, 92 are provided at a face 94 of the second chiller 54. In some examples, as shown, the faces 93, 94 face outward in opposite directions from one another. As such, in some examples, only one face 93 of the chillers 48, 54 interfaces with liquid refrigerant connections to other devices, and one face 94 of the chillers 48, 54 interfaces with coolant connections to other devices.

Referring to FIG. 8A, the first chiller refrigerant path 82 includes a first chiller refrigerant inlet 95 channel extending through the first chiller 48 from the first chiller refrigerant inlet 81 and a first chiller refrigerant outlet channel 96 extending through the first chiller 48 to the first chiller refrigerant outlet 87. In some examples, as shown, central axes through the channels 95, 96 are substantially perpen-dicular (±20 degrees) to the face 93. In some examples, as shown, the flow paths through the channels 95, 96 extend in opposite directions. The channels 95, 96 are in fluid communication with the refrigerant cavities 108 (not shown; see FIG. 10) and are sealed from fluid communication with the coolant cavities 109 (not shown; see FIG. 10) provided between plates 107 (not shown; see FIG. 10) in the first chiller 48. The channels 95, 96, as well as other channels described herein, are provided by aligned through holes through consecutive plates 107 (not shown; see FIG. 10).

The second chiller refrigerant path 84 includes a second chiller refrigerant inlet channel 97 extending through the second chiller 54 and a second chiller refrigerant outlet channel 98 extending through the second chiller 54. In some examples, as shown, central axes through the channels 97, 98 are substantially perpendicular (±20 degrees) to the face 93. In some examples, as shown, the flow paths through the channels 97, 98 extend in opposite directions. The channels 97, 98 are in fluid communication with the refrigerant cavities 108 (not shown; see FIG. 10) and are sealed from fluid communication with the coolant cavities 109 (not shown; see FIG. 10) in the second chiller 54.

The first chiller 48 includes a refrigerant inlet transfer channel 99 extending from the second chiller refrigerant inlet 83 to the second chiller refrigerant inlet channel 97 and a refrigerant outlet transfer channel 100 extending from the second chiller refrigerant outlet channel 98 to the a second chiller refrigerant outlet 87. The transfer channels 99, 100 are fluidly sealed from both the refrigerant cavities 108 and the coolant cavities 109 (not shown; see FIG. 12) in the first chiller 48. In some examples, as shown, central axes through the channels 99, 100 are substantially perpendicular (±20 degrees) to the face 93. In some examples, as shown, the flow paths through the channels 99, 100 extend in opposite directions.

Figure 9:
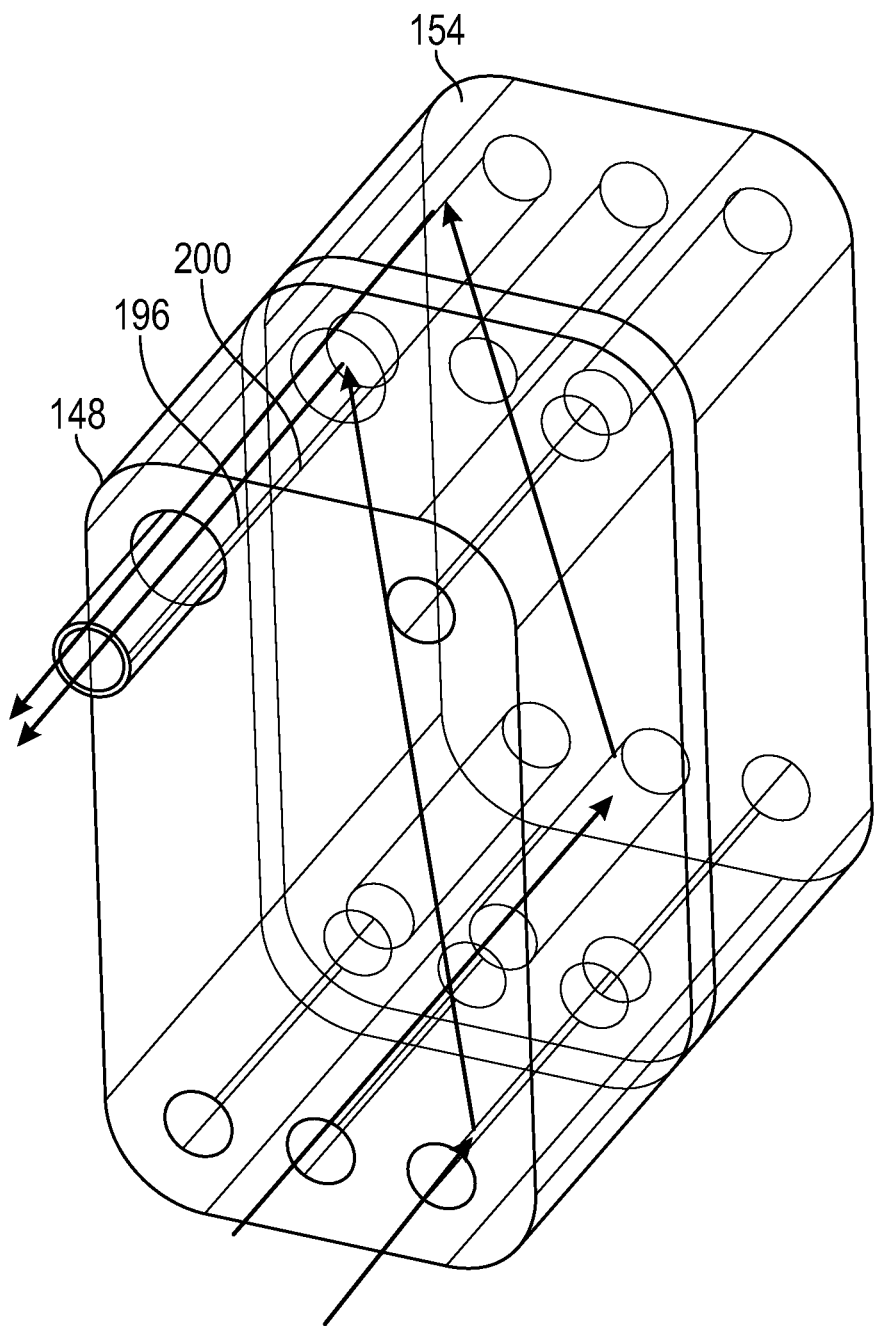
FIG. 9 schematically illustrates more example chillers of the example refrigeration system

FIG. 9 illustrates example chillers 148, 154, substantially identical to the chillers 48, 54, except that the outlet transfer channel 200 and the first refrigerant outlet channel 196 are the same. In some examples, as shown, the channel 196/200 has a larger diameter than the other channels to compensate for the two flows. In some examples, the channel 196/200 is not fluidly sealed from the refrigerant cavities.

Referring to FIG. 8B, the second chiller coolant fluid path 88 includes a second chiller coolant inlet channel 101 extending from the inlet 90 through the second chiller 54 and a second chiller coolant outlet channel 102 extending through the second chiller 54 to the outlet 92. The channels 101, 102 are in fluid communication with the coolant cavities 109 (not shown; see FIG. 11) within the second chiller 54 and sealed from fluid communication with the refrigerant cavities 108 (not shown; see FIG. 11) within the second chiller 54. In some examples, as shown, central axes through the channels 101, 102 are substantially perpendicular (±20 degrees) to the face 94. In some examples, as shown, the flow paths through the channels 101, 102 extend in opposite directions.

The first chiller coolant fluid path 86 includes a first chiller coolant inlet channel 103 extending through the first chiller 48 and a first chiller coolant outlet channel 104 extending through the first chiller 48. The channels 103, 104 are in fluid communication with the coolant cavities 109 (not shown; see FIG. 11) and sealed from fluid communication with the refrigerant cavities 108 (not shown; see FIG. 11) within the first chiller 48. In some examples, as shown, central axes through the channels 103, 104 are substantially perpendicular (±20 degrees) to the face 94. In some examples, as shown, the flow paths through the channels 103, 104 extend in opposite directions.

The second chiller 54 includes a coolant inlet transfer channel 105 for transferring coolant from the inlet 89, through the second chiller 54, and to the first chiller coolant inlet channel 103 and a coolant outlet transfer channel 106 for transferring coolant from the first chiller coolant outlet channel 104, through the second chiller 54, and to the outlet 91. The channels 105, 106 are sealed from fluid communication with the coolant cavities 109 (not shown; see FIG. 12) and the refrigerant cavities 108 (not shown; see FIG. 12) within the first chiller 48. In some examples, as shown, central axes through the channels 105, 106 are substantially perpendicular (±20 degrees) to the face 94. In some examples, as shown, the flow paths through the channels 105, 106 extend in opposite directions.

In some examples as shown, the channels 96, 98, 100, 101, 103, and 105 are provided near upper ends U of the chillers 48, 54, and the channels 95, 97, 99, 102, 104, 106 are provided near lower ends L of the chillers 48, 54 with respect to the orientations shown in FIGS. 8A and 8B.

Figure 10:
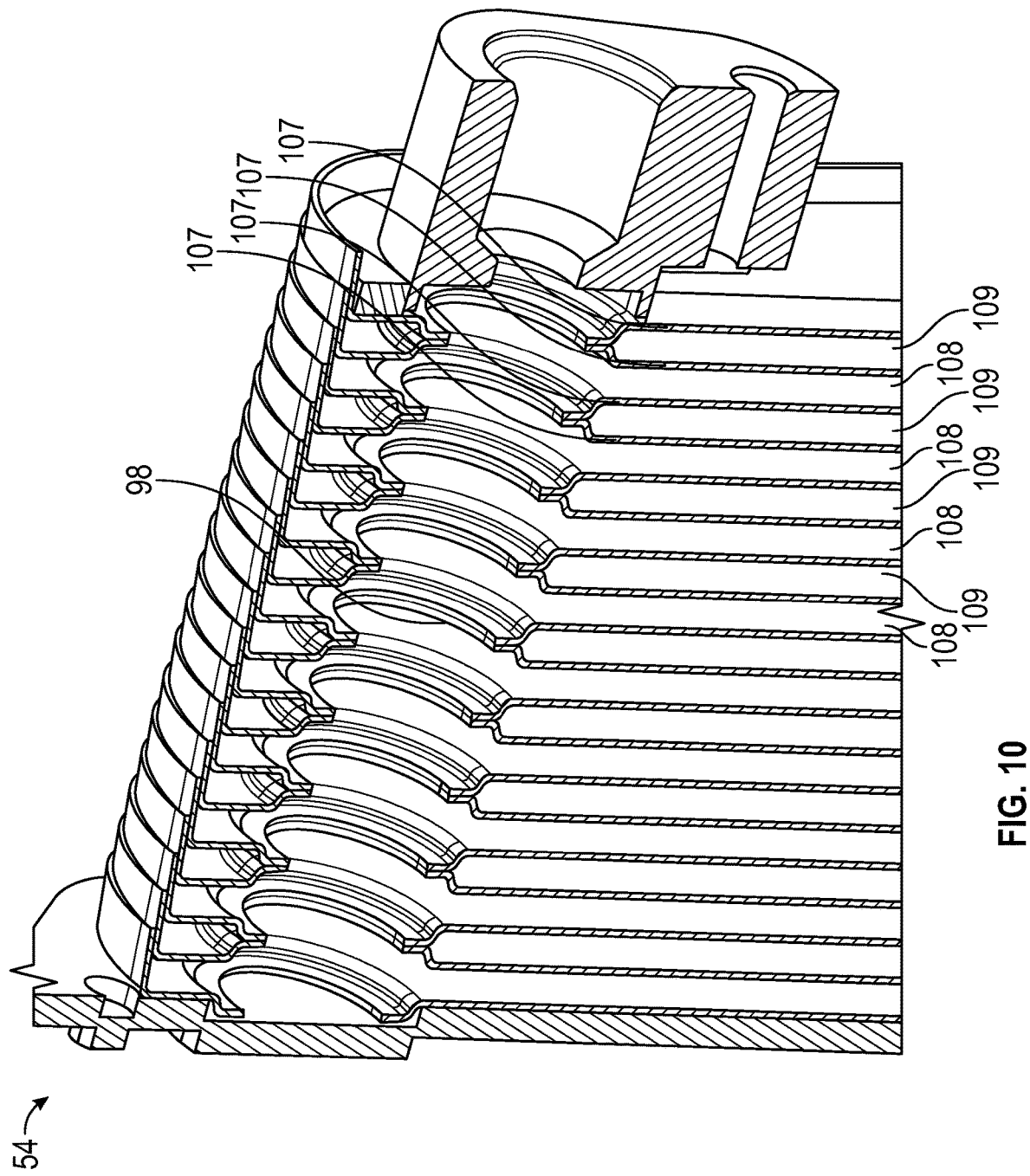
FIG. 10 illustrates a sectional view of a channel in an example chiller.

FIG. 10 shows a sectional view of an example chiller 54. In some examples, as shown, the example chiller 54 includes a plurality of plates 107 substantially parallel (±20 degrees) to one another and substantially parallel to one or both of the respective faces 93, 94 (not shown, see FIGS. 8A and 8B). In some examples, as shown, the plates 107 form a plurality of refrigerant cavities 108 therebetween for receiving refrigerant and a plurality of coolant cavities 109 for receiving coolant and arranged between respective ones of the refrigerant cavities 108 in alternating fashion. That is, a first and second plate 107 form a refrigerant cavity 108, the second and third plate 107 form a coolant cavity 109, and the third and fourth plate 107 form a refrigerant cavity 108, and so on. The example refrigerant cavities 108 are fluidly separate from the coolant cavities 109, such that the refrigerant and coolant do not mix within the chiller 54. However, the refrigerant in the refrigerant cavities 108 is still able to exchange heat with the coolant in the coolant cavities 109. The example chiller 48 may be similarly configured. In some examples, the plates 107 of the chiller 48 are substantially parallel to the plates 107 of the chiller 54 in the stacked arrangement.

FIG. 10 further illustrates the example channel 98. As shown, the plates 107 forming the coolant cavities 109 are brazed together at the channel 98 to prevent fluid communication between the channel 98 and the coolant cavities 109 but allow fluid communication between the channel 98 and the refrigerant cavities 108. The channels 95, 96, and 97 are similarly configured to the channel 98 in some examples, as described above.

Figure 11:
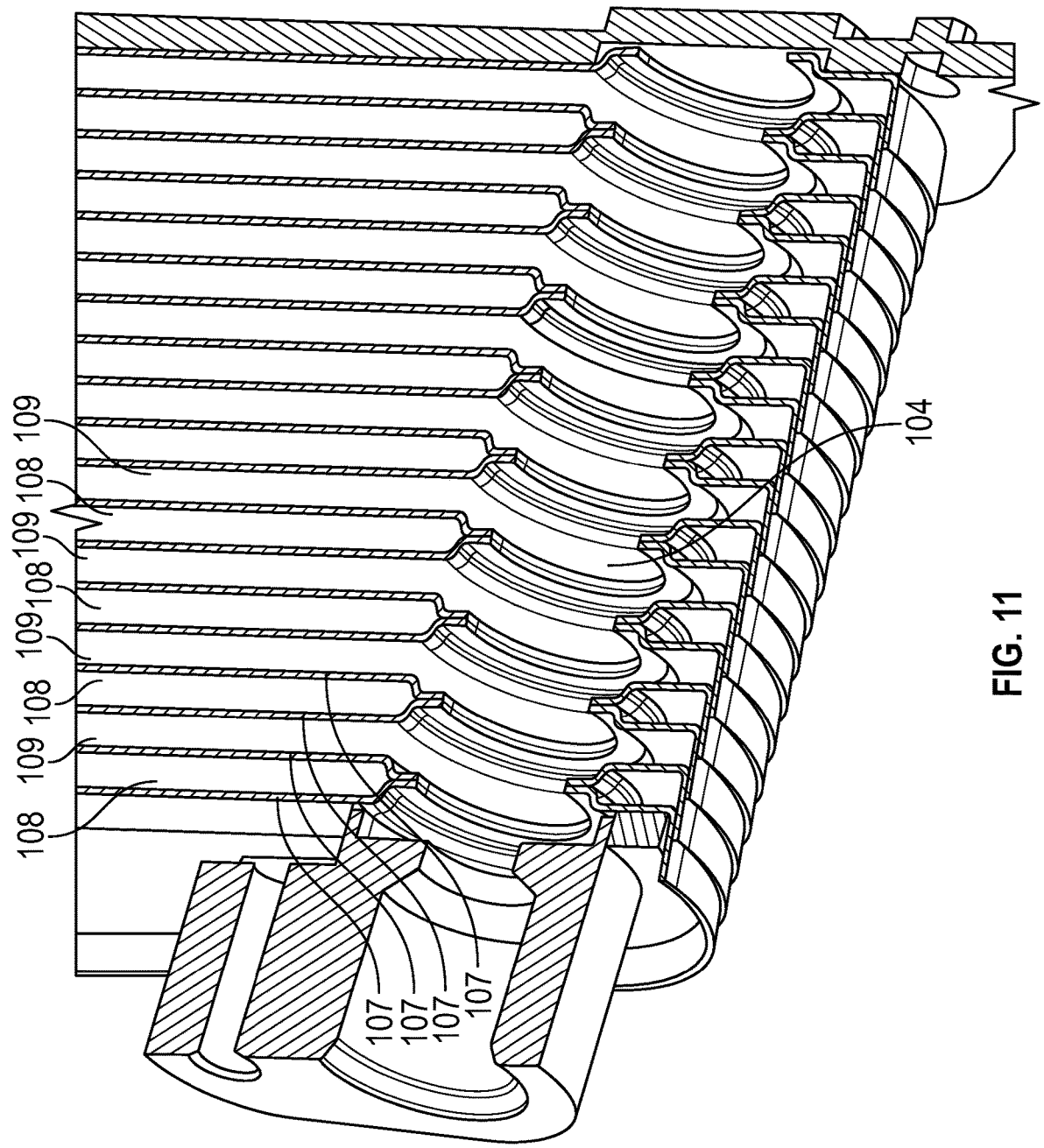
FIG. 11 illustrates a sectional view of another channel in an example chiller.

FIG. 11 illustrates the example channel 104. As shown, the plates 107 forming the refrigerant cavities 108 are brazed together at the channel 104 to prevent fluid communication between the channel 104 and the refrigerant cavities 108 but allow fluid communication between the channel 104 and the coolant cavities 109. The channels 101, 102, 103 are similarly configured to the channel 104 in some examples, as described above.

Figure 12:
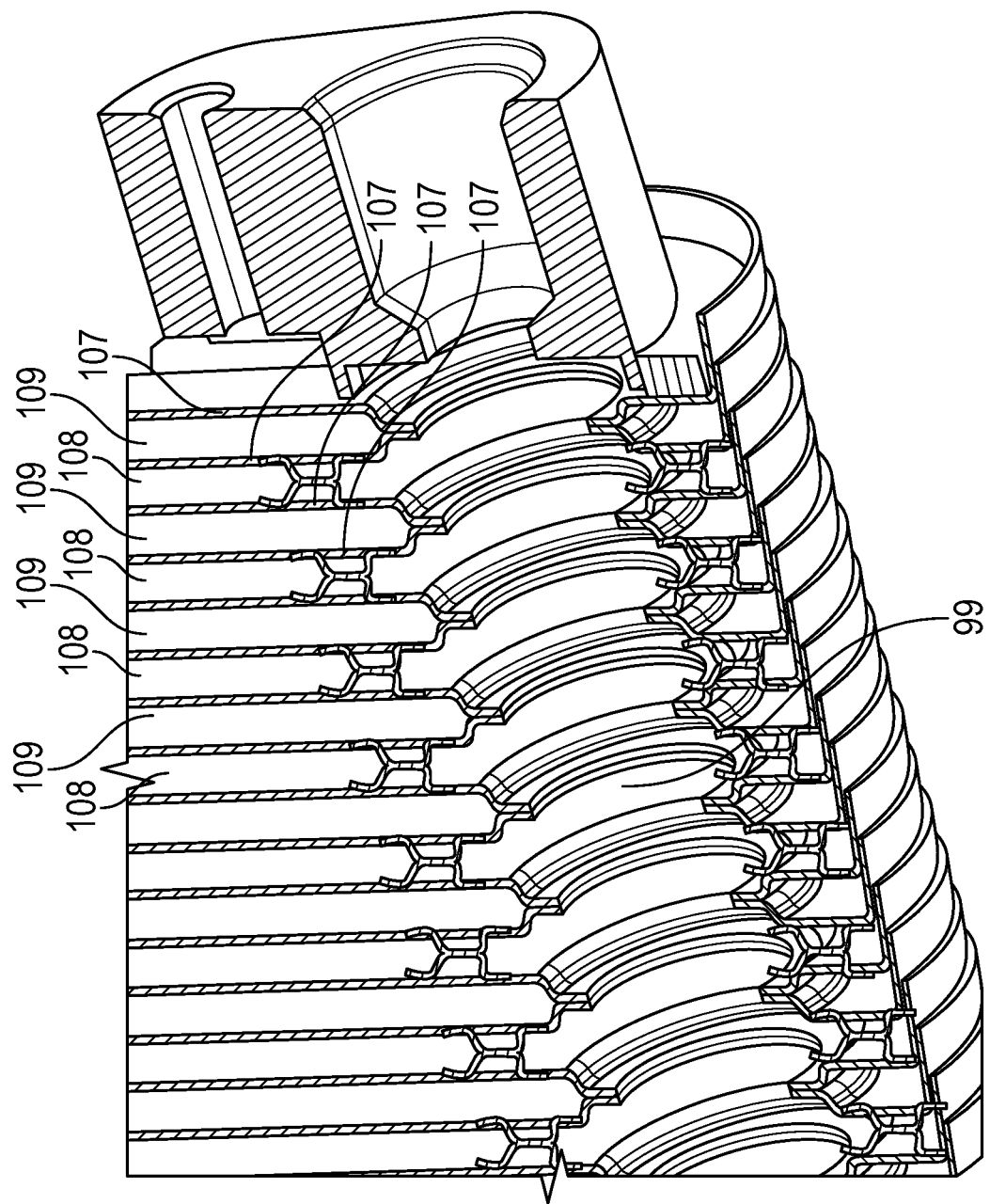
FIG. 12 illustrates a sectional view of another channel in an example chiller.

FIG. 12 illustrates an example transfer channel 99. As shown, the plates 107 are brazed together at the channel 99 to prevent fluid communication between the channel 99 and the refrigerant cavities 108 and to further prevent fluid communication between the channel 99 and the coolant cavities 109. The channels 100, 105, 106 are similarly configured to the channel 99 in some examples, as described above.

Figure 13:
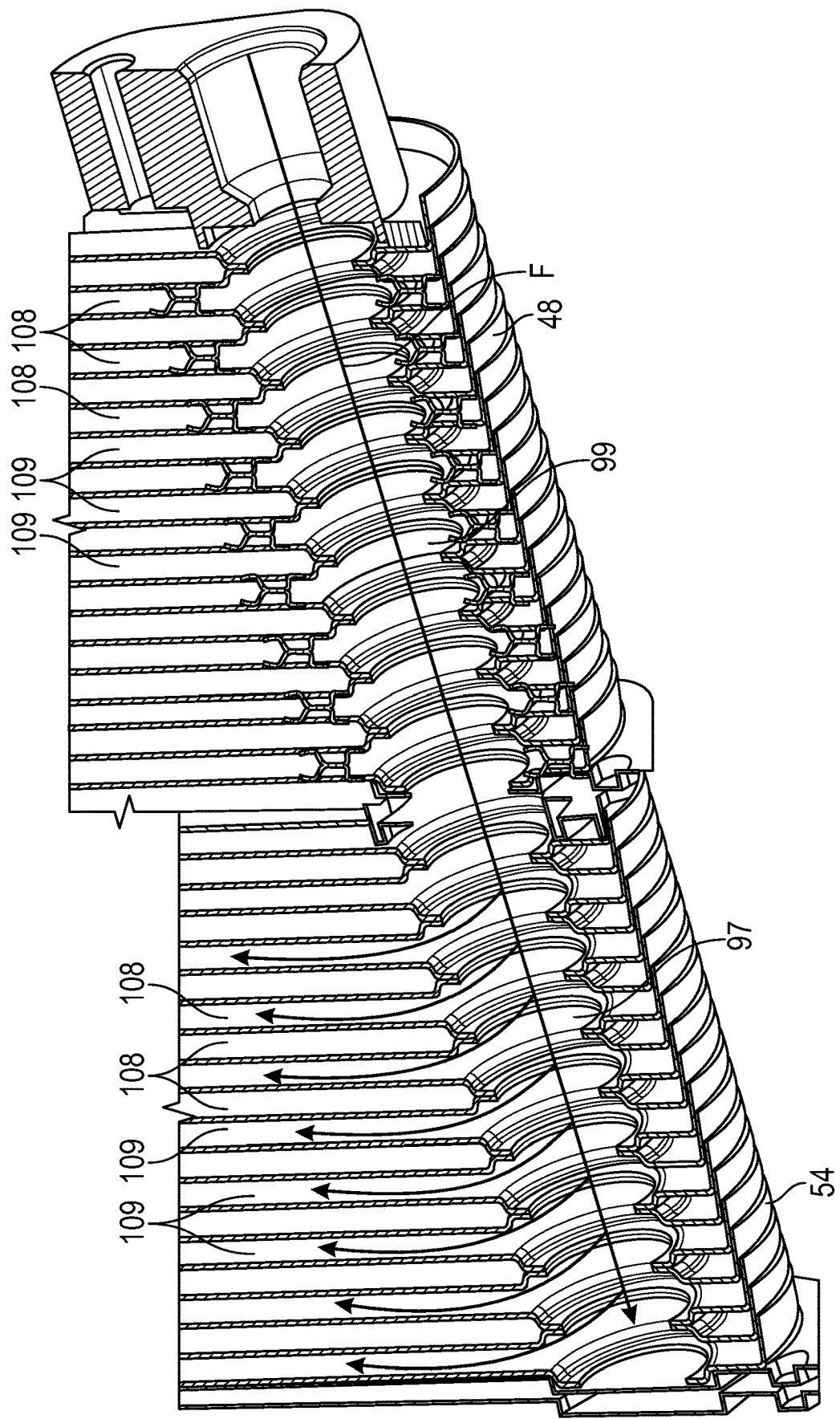
FIG. 13 schematically illustrates the flow of refrigerant through example channels.

FIG. 13 schematically illustrates the flow F of refrigerant through channels 99 and 97. The transfer channel 99 is fluidly sealed from both the refrigerant cavities 108 and the coolant cavities 109 in the first chiller 48. The channel 97 is in fluid communication with the refrigerant cavities 108 and are sealed from fluid communication with the coolant cavities 109 in the second chiller 54.

Figure 14:
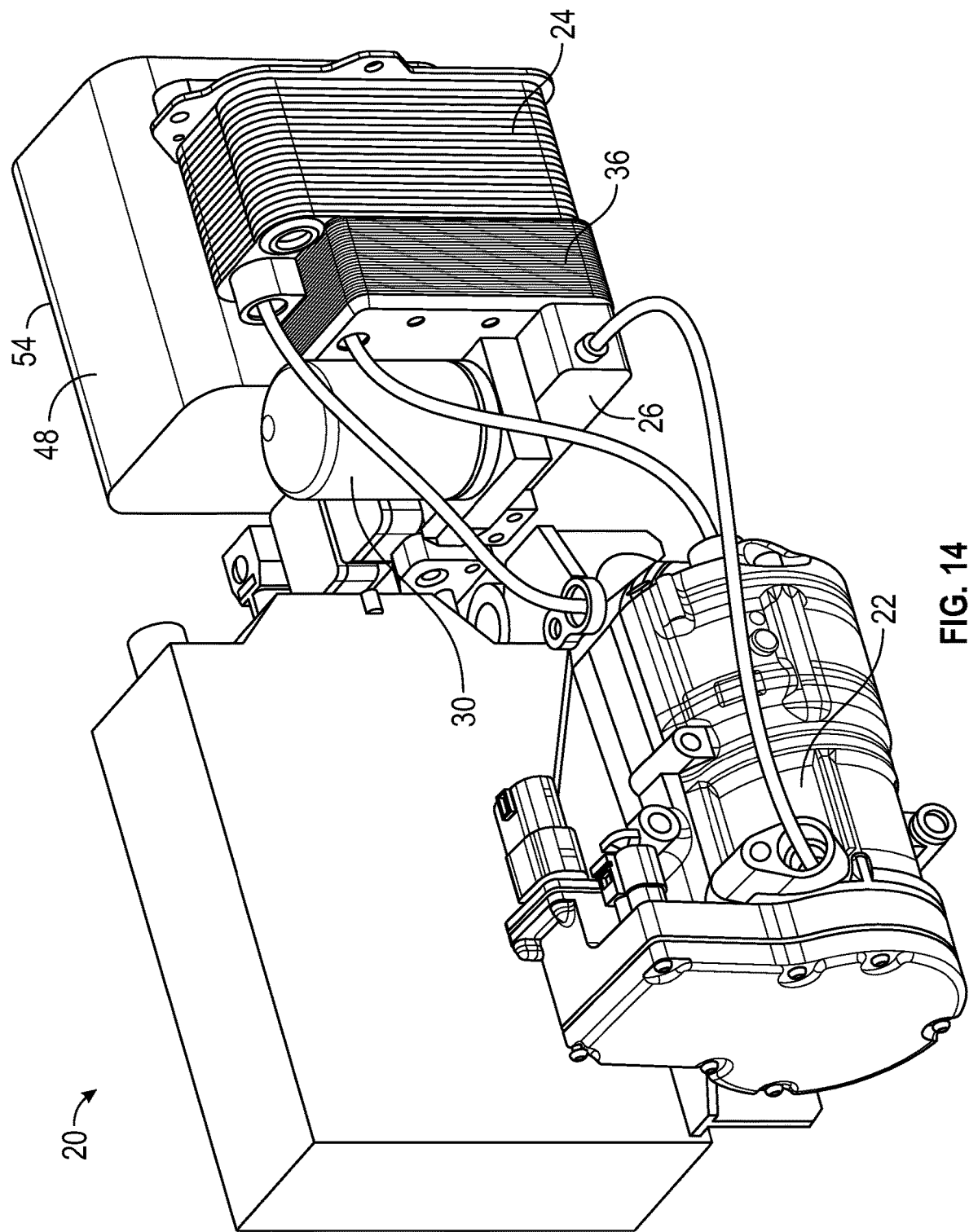
FIG. 14 illustrates an example configuration of the example refrigeration system.

Although chillers are described in the illustrative examples, other heat exchangers can additionally or alternatively be positioned in a stacked arrangement in some examples. For example, as shown in FIG. 14, the condenser 24 and vapor injection module 36 may be alternatively or additionally be positioned in a stacked arrangement in the system 20.

FIG. 15 schematically illustrates the flow paths through a sectional view of the condenser 24 and vapor injection module 36. The example condenser 24 is configured similarly to the chillers previously discussed and includes a channel 298 in fluid communication with refrigerant cavities 308 (not shown; see cavities 108 in FIG. 10) and sealed from fluid communication with the coolant cavities 309 (not shown; see cavities 109 in FIG. 10). The refrigerant from channel 298 is then received in a transfer channel 300 in the vapor injection module 36, which is configured similarly to the chillers previously discussed, and the transfer channel 300 is fluidly sealed from all plate cavities (not shown). The example vapor injection module 36 is configured similarly to the chillers previously discussed in that it includes a plurality of plates providing sets of alternating cavities for the two separate flows of refrigerant discussed herein. The refrigerant then exits the vapor injection module 36 into the control block 26. Similar to the chillers discussed herein, the condenser 24 may include other channels for coolant fluidly sealed from the refrigerant cavities and in fluid communication with coolant cavities. The condenser 24 may include at least one additional refrigerant channel at its upper end fluidly sealed from the coolant cavities and in fluid communication with refrigerant cavities.

An example vehicle refrigeration system can be said to include a first heat exchanger including a plurality of plates, a refrigerant fluid path, a coolant fluid path, and a face providing: a first refrigerant inlet, a second refrigerant inlet, a first refrigerant outlet, and a second refrigerant outlet. A second heat exchanger includes a plurality of plates, a refrigerant fluid path, a coolant fluid path, and a face providing: a first coolant inlet, a second coolant inlet, a first coolant outlet, and a second coolant outlet. A refrigerant control block includes a plurality of openings interfacing with the first refrigerant inlet and the second refrigerant inlet. In some examples, the first heat exchanger includes a refrigerant transfer channel through the plates for transferring refrigerant through the first heat exchanger to the second heat exchanger. In some examples, the second heat exchanger includes a coolant transfer channel through the plates for transferring coolant through the second heat exchanger to the first heat exchanger. In some examples, the first heat exchanger includes a second refrigerant transfer channel through the plates for transferring refrigerant from the second heat exchanger, through the first heat exchanger, to the second refrigerant outlet, and the second heat exchanger includes a second coolant transfer channel through the plates for transferring coolant from the first heat exchanger, through the second heat exchanger, and to the first coolant outlet.

The systems disclosed herein provide a packaging advantage by requiring less packaging volume compared to prior art designs. The systems disclosed herein reduce plumbing connections, reduce assembly time, reduce cost, reduce leak paths, and/or reduce quantity of components needed for function.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle refrigeration system, comprising:
   a first chiller including a refrigerant fluid path and a coolant fluid path;
   a second chiller including a refrigerant fluid path, a coolant fluid path, a first chiller coolant inlet, a second chiller coolant inlet, a first chiller coolant outlet, and a second chiller coolant outlet; and
   a refrigerant control block including a plurality of outer walls providing a plurality of openings in fluid communication with a plurality of control block refrigerant fluid paths, the plurality of openings comprising:
   a first chiller control block outlet,
   a second chiller control block outlet, wherein the first chiller is configured to receive refrigerant flowing out of the first chiller control block outlet and into the first chiller refrigerant fluid path, the second chiller is configured to receive refrigerant flowing out of the second chiller control block outlet, through the first chiller, and into the second chiller refrigerant fluid path, the second chiller is configured to receive coolant flowing into the second chiller coolant inlet, through the second chiller coolant fluid path, and out of the second chiller coolant outlet, and the first chiller is configured to received coolant flowing into the first chiller coolant inlet, through the second chiller, through the first chiller coolant fluid path, and out of the first chiller coolant outlet.

2. The system as recited in claim 1, wherein the first and second chillers are positioned in a stacked arrangement.

3. The system as recited in claim 1, wherein one of the first chiller and second chiller is mounted to the other of the first chiller and the second chiller.

4. The system as recited in claim 1, wherein the first and second chillers include a plurality of plates substantially parallel to one another.

5. The system as recited in claim 4, wherein the plurality of plates form a first plurality of cavities and a second plurality of cavities arranged between respective ones of the first plurality of cavities in alternating fashion.

6. The system as recited in claim 5, wherein the first plurality of cavities are configured to receive the refrigerant.

7. The system as recited in claim 6, wherein the second plurality of cavities are configured to receive the coolant.

8. The system as recited in claim 7, wherein the first chiller refrigerant path includes a first chiller refrigerant inlet channel and a first chiller refrigerant outlet channel in fluid communication with the first plurality of cavities in the first chiller and sealed from fluid communication with the second plurality of cavities within the first chiller.

9. The system as recited in claim 8, wherein the second chiller refrigerant path includes a second chiller refrigerant inlet channel and a second chiller refrigerant outlet channel in fluid communication with the first plurality of cavities in the second chiller and sealed from fluid communication with the second plurality of cavities within the second chiller.

10. The system as recited in claim 9, wherein the first chiller includes a refrigerant inlet transfer channel fluidly between the second chiller control block outlet and the second chiller refrigerant inlet channel, and a refrigerant outlet transfer channel fluidly between the second chiller refrigerant outlet channel and the refrigerant control block, and the inlet transfer channel is sealed from fluid communication with the first plurality of cavities and the second plurality of cavities within the first chiller.

11. The system as recited in claim 10, wherein the outlet transfer channel is sealed from fluid communication with the first plurality of cavities and the second plurality of cavities within the first chiller.

12. The system as recited in claim 1, wherein the first chiller provides coolant to a first component of a vehicle, and the second chiller provides coolant to a second, different component of the vehicle.

13. The system as recited in claim 10, wherein the second chiller coolant fluid path includes a second chiller coolant inlet channel and a second chiller coolant outlet channel in fluid communication with the second plurality of cavities within the second chiller and sealed from fluid communication with the first plurality of cavities within the second chiller.

14. The system as recited in claim 13, wherein the first chiller coolant fluid path includes a first chiller coolant inlet channel and a first chiller coolant outlet channel in fluid communication with the second plurality of cavities within the first chiller and sealed from fluid communication with the first plurality of cavities within the first chiller.

15. The system as recited in claim 14, wherein the second chiller includes a coolant inlet transfer channel for transferring coolant to the first chiller coolant inlet channel and a coolant outlet transfer channel for transferring coolant from the first chiller coolant outlet channel.

16. The system as recited in claim 15, comprising
    a condenser
    a vapor injection module;
    wherein the condenser and vapor injection module are positioned in a stacked arrangement.

* * * * *